219-121

4/28/87 SR

OR 4,661,682

United States Patent [19]

Gruner et al.

[11] Patent Number: 4,661,682

[45] Date of Patent: Apr. 28, 1987

[54] PLASMA SPRAY GUN FOR INTERNAL COATINGS

[75] Inventors: Heiko Gruner, Beinweil a.See; Markus Müller, Villmergen, both of Switzerland

[73] Assignee: Plasmainvent AG, Zug, Switzerland

[21] Appl. No.: 765,940

[22] Filed: Aug. 15, 1985

[30] Foreign Application Priority Data

Aug. 17, 1984 [DE] Fed. Rep. of Germany ....... 3430383

[51] Int. Cl.[4] .............................................. B23K 15/00

[52] U.S. Cl. ........................ 219/121 PL; 219/121 PR; 219/76.16

[58] Field of Search .................. 219/121 PL, 121 PM, 219/121 PP, 121 PQ, 74, 75, 76.16, 121 P; 313/231.31, 231.41, 231.51; 427/34

[56] References Cited

U.S. PATENT DOCUMENTS 3,936,586 2/1976 Tylko ........................... 219/121 PR
4,032,744 6/1977 Coucher ........................ 219/121 PR
4,127,760 11/1978 Meyer et al. .................. 219/121 PL
4,140,892 2/1979 Muller .......................... 219/121 PL

FOREIGN PATENT DOCUMENTS 1546810 10/1970 Fed. Rep. of Germany .
1240124 7/1971 United Kingdom .

*Primary Examiner*—M. H. Paschall
*Attorney, Agent, or Firm*—Fitzpatrick, Cella, Harper & Scinto

[57] ABSTRACT

In a plasma spray gun (1) including a cooled electrode (10) and burner nozzle (12) for insertion in pipes and bores of work pieces and for coating the inner surfaces of these work pieces, for the coating of bores with a minimal diameter of 25 mm the electrode (10) is designed rotation-asymmetrically in the area of its head (15), and the diameter of the electrode (10) is smaller than the minimal inner diameter of the burner nozzle (12), while the burner nozzle (12) on the end facing away from the electrode (10) has at least one partial area (17) with an inner diameter which is larger than its minimal inner diameter, and the powder injector (13) has a flat exit cross-section.

11 Claims, 9 Drawing Figures

PLASMA SPRAY GUN FOR INTERNAL COATINGS

FIELD OF THE INVENTION

The invention concerns a plasma spray gun with a cooled electrode and burner nozzle for insertion in pipes and bores of work pieces and for coating the internal surfaces of said work pieces.

A preferred field of application for such plasma spray guns is the coating of contact surfaces of the blade roof and turbine disc within the holder grooves of the turbine disc in the case of aircraft gas turbine engines.

DESCRIPTION OF THE PRIOR ART

In a known plasma spray gun of this type, the reduction of the geometrical dimensions of the burner nozzle-electrode pairing allowed the coating of the internal surfaces to be carried out in the required spray layer quality in bores of minimal inner diameter of 70 mm. In the known inner burner, plasma spray energy, plasma gas discharge and spray powder injection on the one hand and geometrical reduction of the burner nozzle electrode pairing on the other are coordinated so that practically any spray powder, for whose melting standard burners needed a flight path of up to 150 mm within the plasma flame, is molten after a flight path of about 35 mm. The spray spacing between the plasma spray gun and the substrate surface as well as the geometrical dimensions of the total inner burner define the minimal tube or bore diameter, with which coating can be performed with the same spray layer quality. Thus the latter is fixed in advance by the normal design of the plasma spray gun. It would be possible by reducing the plasma energy, the plasma gas amount, and the amount of injected powder to decrease the plasma flame length and thus the spray spacing in order to coat bores of smaller diameter as well; but this would only be possible at the expense of the spray layer quality.

SUMMARY OF THE INVENTION

An object of the invention is to provide a plasma spray gun of the type named above which makes possible a coating of higher quality on the internal surfaces of tubes and bores having minimal inner diameters of about 25 mm with increased spraying efficiency.

This is provided by this invention in that:

(a) the electrode is designed in the area of its head to be rotation-asymmetrical, (b) the diameter of the electrode is smaller than the minimal inner diameter of the burner nozzle, (c) the burner nozzle on the end facing away from the electrode has at least one partial area with an inner diameter which is larger than its minimal inner diameter, and (d) the powder injector has a flat exit cross-section.

Using such a design for the plasma spray gun, the described burner nozzle electrode pairing ensures that the injected powder particles are melted with a very short flame length and thus flight path. Not only is the flame length shortened but the plasma flame is elliptically shaped as well, which leads both to an increase in the geometrical spray efficiency based on the spray jet diameter as well as to an equallized thickness of the sprayed layer during each spraying passage.

The electrode has advantageously two diametrically opposed bevellings on its semispherical head.

Advantageously the burner nozzle is expanded conically from its minimal inner diameter away from the electrode into an exit area having an inner annular surface of larger inner diameter.

The longitudinal axis of the flat exit cross-section of said powder injector is expediently arranged perpendicular to the connecting line between the bevellings of said electrode.

In order to optimize the heat discharge from the plasma spray gun and thus both to maintain the required spray layer quality by means of constant burner output as well as to increase the service life of the burner components, the electrode and the burner nozzles are expediently cooled by two separate water circuits.

To support this effect in addition a nozzle ring can provide for surface cooling and for blow-out of spray dust via an annular gas protective sleeve. As an alternative a separate lead can be provided via which a gas cooling and blow-out of the spray dust is effected directly at the burner nozzle. With such a design of the plasma spray gun there is an additional discharge of the reflected spray dust from the bore surface to be coated, which leads to a higher quality of the coating.

Further the burner advantageously consists of a stable cast portion with all the elements which are not subject to wear and tear and a portion capable of being opened which carries the elements subjected to wear including the electrode, the burner nozzle and the powder injector for easy replacement. All the components which are naturally subjected to attrition during the operation of the gun can thus be easily and simply exchanged.

The portion capable of being opened has advantageously two foldable semi-shells which are separated by an insulating plate.

For a further increase in the service life of the replaceable burner nozzle, the latter is sealed by O-rings against its cooling channel and the seat of said O-rings is designed so that they abut at the most on only one of four sealing surfaces directly on the burner nozzle and abut at least two of the four sealing surfaces on cooled components which are good heat conductors. Further channels for direct coolant access from the cooling channel to said O-rings are advantageously provided.

Using the plasma spray gun according to the invention, the distribution and melting on of the injected powder particles are performed in a broad coating spot whereby the substrate material, despite the small spray spacing, can be coated without excessive thermal stresses which is especially important in the case of thin-walled tubes. The additional gas cooling supports this effect.

The invention is explained in more detail below by the embodiments and with reference to the drawings.

DESCRIPTION OF PREFERRED EMBODIMENTS

Figure 1:
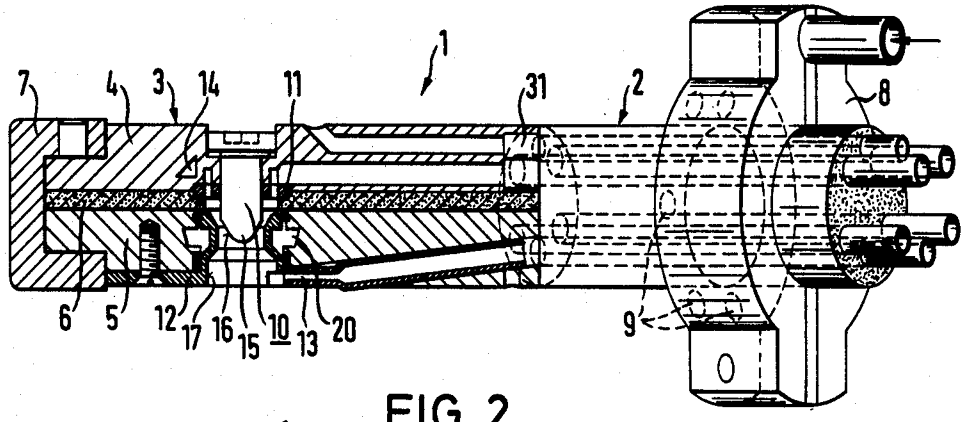
FIG. 1 is a longitudinal section through an embodiment of an invented plasma spray gun for inner coatings.
Figure 2:
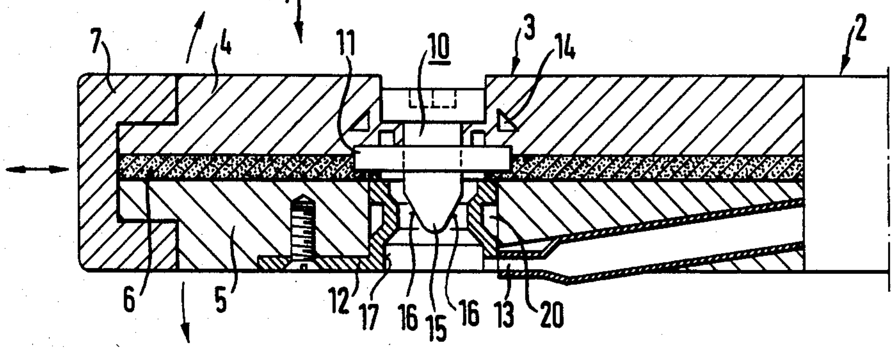
FIG. 2 is an enlarged partial cut-out of the burner head in FIG. 1 shown schematically.
Figure 3:
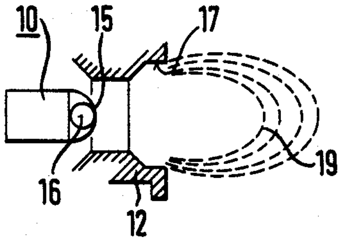
FIG. 3 is a schematic side sectional view of the electrode and burner nozzle of said plasma spray gun.
Figure 4:
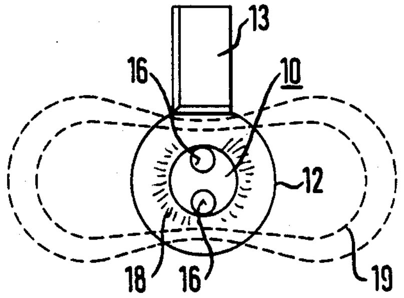
FIG. 4 is a schematic frontal view of the arrangement in FIG. 3.

The plasma spray gun 1 for internal coatings shown in FIGS. 1 and 2 has a stable cast portion 2 with all the elements which are not subject to wear, and an openable portion 3. The latter portion 3 consists of a cathode semi-shell 4 and an anode semi-shell 5 which are separated by an insulating plate 6, designed to be folded up, and held together by a clamp 7. On the stably cast portion 2 there is a nozzle ring 8 with nozzle apertures 9, via which a gas protective sleeve can be produced around the plasma spray gun for surface cooling and for the blow-out of the spray dust. Instead of this nozzle ring 8 or additionally thereto, a separate lead 31 can be guided directly into the area of the burner nozzle.

In the cathode semi-shell 4 an electrode 10 is secured so as to be easily exchangeable. An insulating and replaceable gas distribution ring 11 is inserted in the insulating plate 6. In the anode semi-shell 5 a burner nozzle 12 which is fixed with an extension lash is inserted to be easily replaceable. A powder injector 13 with a flat exit cross-section is also inserted so as to be easily replaceable in said anode semi-shell 5.

In the cathode semi-shell 4 there is a cooling channel 14 for the cooling of the electrode 10 while anode semi-shell 5 has a cooling channel 14 to cool the burner nozzle 12. Both cooling channels are charged in parallel with coolant, for example water, gas or liquid carbon dioxide.

Portion 2 represents the burner shaft, portion 3 the burner head. After release of the clamp 7 the cathode semi-shell 4 and the anode semi-shell 5 are folded away from each other in order to provide access to the gas distribution ring 11 optionally for its replacement together with the insulating ring 6. Electrode 10 has a semi-spherical head 15 with diametrically opposed bevellings 16. The diameter of electrode 10 is smaller than the minimal diameter of the burner nozzle 12. This nozzle 12 is conically expanded proceeding from its minimal inner diameter away from electrode 10 into an exit area with an inner ring surface 17 of larger inner diameter.

On the bevellings 16 the electric arc 18 formed between electrode 10 and burner nozzle 12 is suppressed and is concentrated on the undisturbed spherical surface of the head 15. This causes a plasma flame 19 which is pressed flat. Due to the conical expansion of the burner nozzle 12 towards the inner ring surface 17, the length of the plasma flame 19 is substantially shortened. The flat outlet cross-section of the powder injector 13 ensures that the powder injection corresponds to the flattened plasma flame 19.

Figure 5:
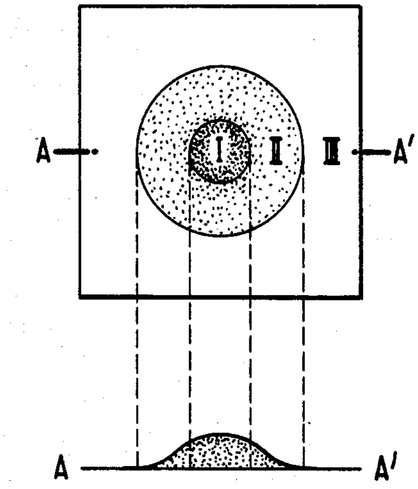
FIG. 5 is a schematic illustration of the coating efficiency and layer thickness distribution in the static spray diagram in the case of a rotation symmetrical burner nozzle electrode configuration.

FIG. 5 shows schematically the coating efficiency distributed over the plasma jet cross-section, taken by means of a static spray diagram on a substrate layer and the corresponding layer thickness in the case of a conventional rotation-symmetrical electrode-burner nozzle configuration. In a zone I of the spray jet the result is high coating efficiency with a practically constant growth rate per coating unit of time, in a zone II there is strongly decreasing coating efficiency as spacing from the centre increases and in a zone III there is almost no connecting spray layer any longer. The zones I and II are defined by concentric circles.

Figure 6:
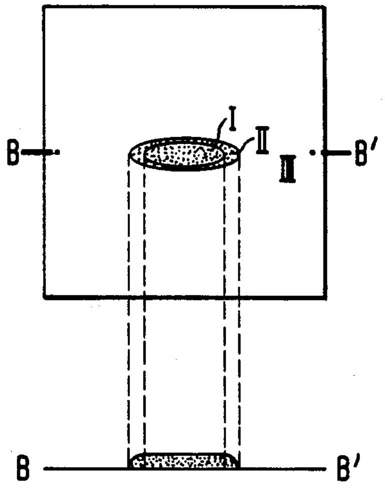
FIG. 6 is a schematic illustration of the coating efficiency and layer thickness distribution in the static spray diagram with a burner nozzle electrode configuration according to the invention.

FIG. 6 shows the coating efficiency and layer thickness distribution for an inventive rotation-asymmetrical electrode burner nozzle configuration. The zones I and II are strongly bevelled elliptically, while the width of zone II is very small. The layer thickness within zone I is practically constant and drops off in zone II over its small width to zero. This produces a strong increase in the geometrical efficiency based on the spray jet diameter.

Figure 7:
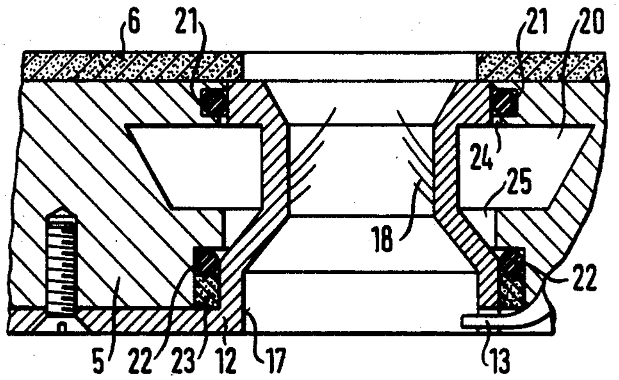
FIG. 7 is a schematic illustration of the burner nozzle holder and sealing thereof.

FIG. 7 shows that the burner nozzle 12 is sealed by two O-rings 21, 22 against its associated cooling channel 20. Both the O-rings 21, 22 abut respectively only one of the four sealing surfaces on the burner nozzle 12. A second sealing surface of the O-rings 21, 22 is formed for their thermal protection on the insulating plate 6 or on the insulating body 23, whereas the O-rings 21, 22 abut on their two other sealing surfaces the good thermally conducting components which are cooled by cooling channel 20. From cooling channel 20 additional channels 24, 25 are provided for direct access by the coolant to the O-rings 21, 22. This provides especially good heat protection for the endangered O-rings 21,22.

Figure 8:
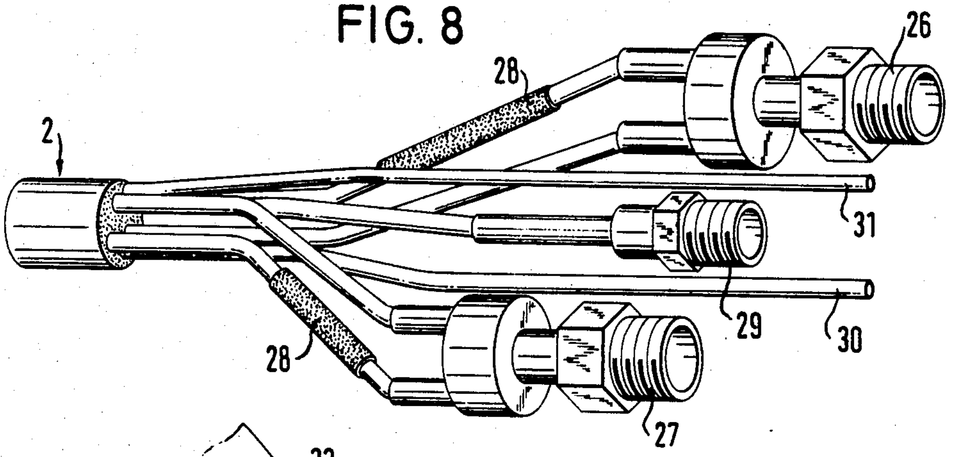
FIG. 8 is an example of the supply by two separate coolant water circuits.

FIG. 8 shows the leads to the plasma spray gun 1. via a water inlet 26 coolant is supplied parallel to the cooling channels 14 and 20 and is again removed via a water outlet 27. On water inlet 26 the plus pole is connected and the minus pole is connected to water outlet 27. Insulating pipes 28 are provided in the ducts for the corresponding insulation of the coolant circuits from the electrical leads. Plasma gas is supplied via a connection 29 and spray powder via a connection 30. Air or gas can be supplied in the area of the gun via an additional lead 31.

Figure 9:
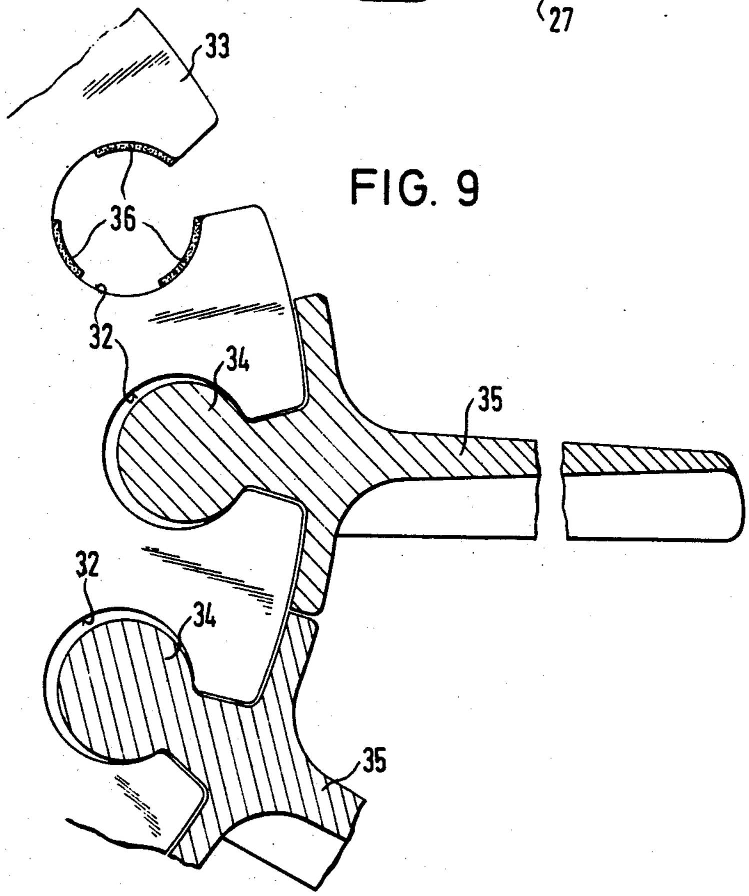
FIG. 9 is a schematic illustration of a turbine disc with turbine blade and internally coated holder groove.

FIG. 9 shows a preferred field of application for the inventive plasma spray gun. In holder grooves 32 of a turbine disc 33 the blade bases 34 of turbine blades 35 are inserted. Coatings 36 are provided using the invented plasma spray gun on the contact surfaces of the blade base 34 and the holder groove 32. It is the object of the coatings 36 to prevent frictional wear, frictional welding and/or dimensional variation of the walls of the grooves in the area of the turbine. These stresses on the holder groove 32 are caused by the necessary installation not free being from play of the turbine blades 35 in the holder grooves 32. These stresses occur above all when starting up and stopping the turbine. They are also relatively large because of the weight of the titanium of titanium alloys that are employed.

For the coating for example a CuNiIn spray layer can be used. The coatings 36 are applied flat and broad-tracked in 3 segments, advantageously each applied in one burner passage.

Below the individual performance and spray data are given as examples of the use of a machine burner according to the prior art, an inner burner according the prior art and an inventively designed inner burner:

Spray powder:

NiAl 95/5% particle size range: −325 mesh grain configuration: Ni-spheres with externally superimposed Al-particles.

plasma flame: $Ar/H_2$ mixture.

Coating parameters for densely sprayed strongly adhesive plasma spray layer:

A. Machine burner according to the prior art:

| | |
|---|---|
| Spray spacing: | 130 mm |
| Plasma energy: | 43 kW |
| Spray spot diameter: (zones I and II) | 25 mm |
| water cooling of gun: | 12 l/min. |
| Fusible powder quantity: | 80 g/min. |

B. Inner burner according to prior art:

| | |
|---|---|
| Spray spacing: | 35 mm |
| Plasma energy: | 28 kW |
| Spray spot diameter rotation-symmetrical (zones I and II): | 15 mm |
| Water cooling of gun: | 5 l/min. |
| Fusible powder quantity: | 40 g/min. |

C. Inner burner designed according to the invention:

| | |
|---|---|
| Spray spacing: | 5 mm |
| Plasma energy: | 4,5-10 kW |
| Spray spot diameter elliptical (zones I and II): | 12 mm |
| water cooling burner: | 10 l/min. |
| Fusible powder quantity: | 20 g/min. |

What is claimed is:

1. A plasma spray gun for insertion into pipes and bores of work pieces and for coating the internal surfaces of said work pieces, comprising:

(a) an electrode having a longitudinal axis and a shape that is radially symmetrical relative to the longitudinal axis, said electrode including an electrode head that has a plurality of surface features within whose peripheries the electrode head deviates from being radially symmetrical;

(b) a burner nozzle in which said electrode is partially and coaxially disposed, said burner nozzle having a minimum inner diameter that is larger than the maximum outer diameter of said electrode;

(c) said burner nozzle having an outer area whose inner diameter is larger than the minimum inner diameter of said burner nozzle; and (d) a powder injector tube arranged at said outer area of said burner nozzle and having a flattened cross-sectional powder exit opening into said burner nozzle.

2. A plasma spray gun as in claim 1, wherein said plurality of surface features on said electrode head are two diametrically opposed bevellings.

3. A plasma spray gun as in claim 1, wherein said burner nozzle is expanded conically from its minimum inner diameter away from said electrode and into an exit area at which the inner annular surface of said burner nozzle has an inner diameter larger than the minimum inner diameter.

4. A plasma spray gun as in claim 1, wherein said electrode head has two of said surfaces features and the longitudinal axis of said flattened cross-sectional powder exit of said powder injector tube is arranged perpendicular to a line connecting said two surface features of said electrode head.

5. A plasma spray gun as in claim 1, wherein said electrode and said burner nozzle are cooled by two separate water circuits.

6. A plasma spray gun as in claim 1, wherein a nozzle ring is provided for surface cooling and blowing out spray dust via an annular gas protective sleeve.

7. A plasma spray gun as in claim 1, wherein a separate lead is provided for gas cooling and blowing out spray dust directly at the burner nozzle.

8. A plasma gun as in claim 1, wherein said burner includes a first stable cast portion with all the elements not subject to wear and a second portion which carries the elements subject to wear including said electrode, said burner nozzle and said powder injector, said second portion capable of being opened for easy replacement of said elements subject to wear.

9. A plasma spray gun as in claim 8, wherein said second portion capable of being opened has two foldable semi-shells which are separated by an insulating plate.

10. A plasma spray gun as in claim 1, wherein said burner nozzle is sealed by a plurality of O-rings against a cooling channel for said burner nozzle and said O-rings are each disposed in a seat that is designed so that (i) said O-rings abut at most on only one of four sealing surfaces directly on said burner nozzle and (ii) said O-rings abut at least two sealing surfaces on cooled components which are good heat conductors.

11. A plasma spray gun as in claim 10, wherein a plurality of channels are provided from said cooling channel to said O-rings.

* * * * *